No. 864,313. PATENTED AUG. 27, 1907.
J. J. LEARY.
EXPLOSIVE ENGINE.
APPLICATION FILED SEPT. 25, 1906.

2 SHEETS—SHEET 1.

Witnesses:
E. A. Kelly
Dava J. Brady

Inventor:
John J. Leary
by Macomber & Ellis
Attorneys

UNITED STATES PATENT OFFICE.

JOHN J. LEARY, OF ROCHESTER, NEW YORK, ASSIGNOR TO ROCHESTER GAS ENGINE COMPANY, OF ROCHESTER, NEW YORK, A CORPORATION OF NEW YORK.

EXPLOSIVE-ENGINE.

No. 864,313.　　　　Specification of Letters Patent.　　　　Patented Aug. 27, 1907.

Application filed September 25, 1906. Serial No. 336,167.

*To all whom it may concern:*

Be it known that I, JOHN J. LEARY, a citizen of the United States, residing at Rochester, in the county of Monroe and State of New York, have invented new and useful Improvements in Explosive-Engines, of which the following is a specification.

My invention relates to explosive engines, and more particularly to means for sealing the joints of the crank case and the bearings of the driving shaft against the passage, either in or out, of gases.

In the manufacture of explosive engines, especially of the type requiring a closed crank-case, great difficulty is experienced in preventing passage of gases through the joints of the base and body of the engine and around the driving-shaft.

My invention meets both of these difficulties in the manner which I will now describe by reference to the annexed drawings in which,—

Figure 1:
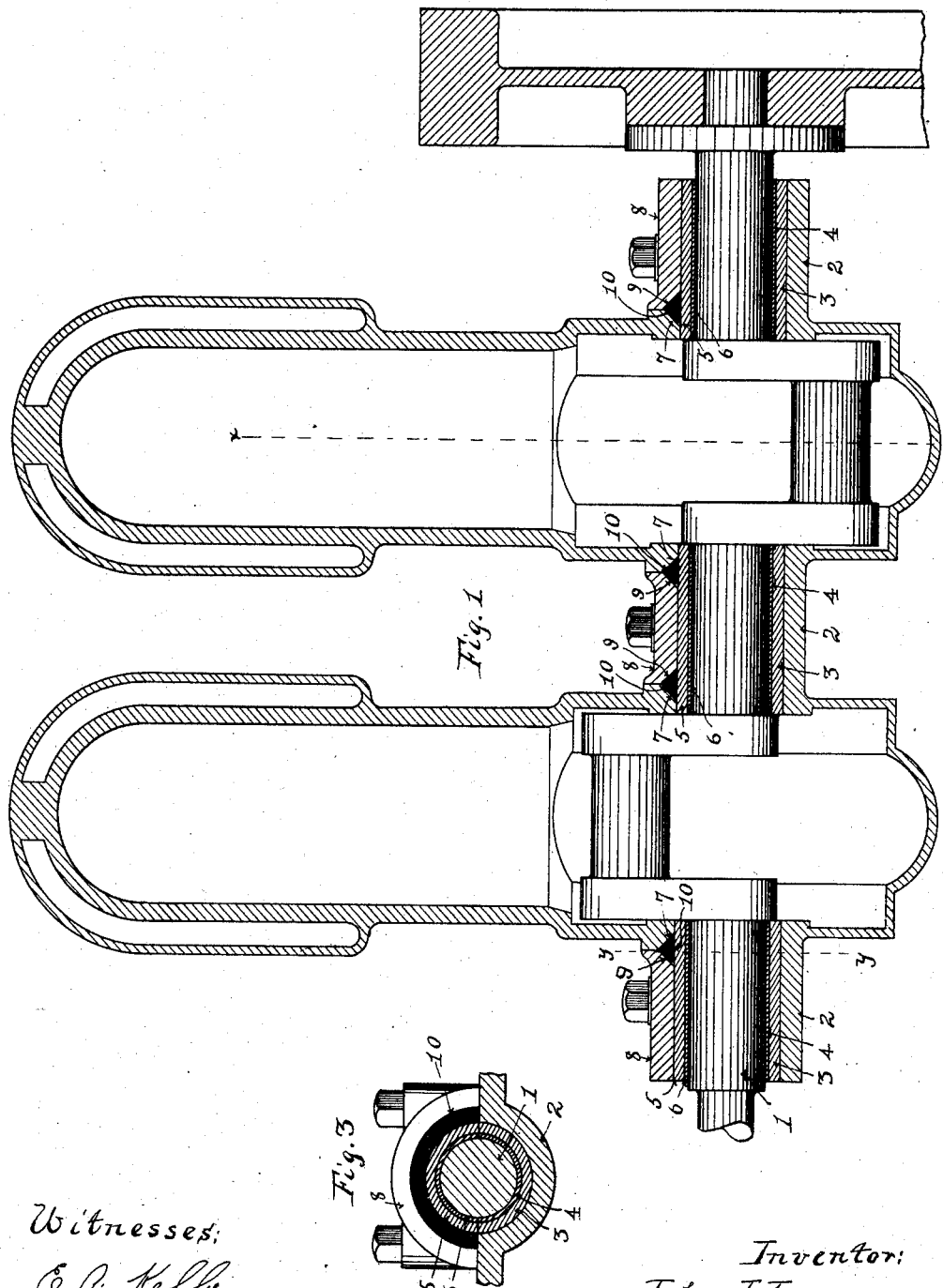
Figure 2:
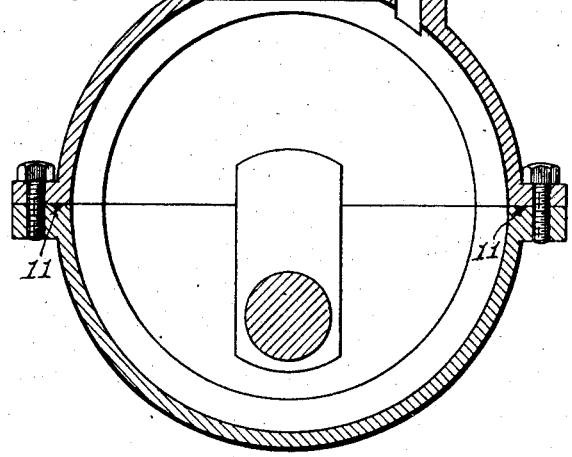
Figure 4:
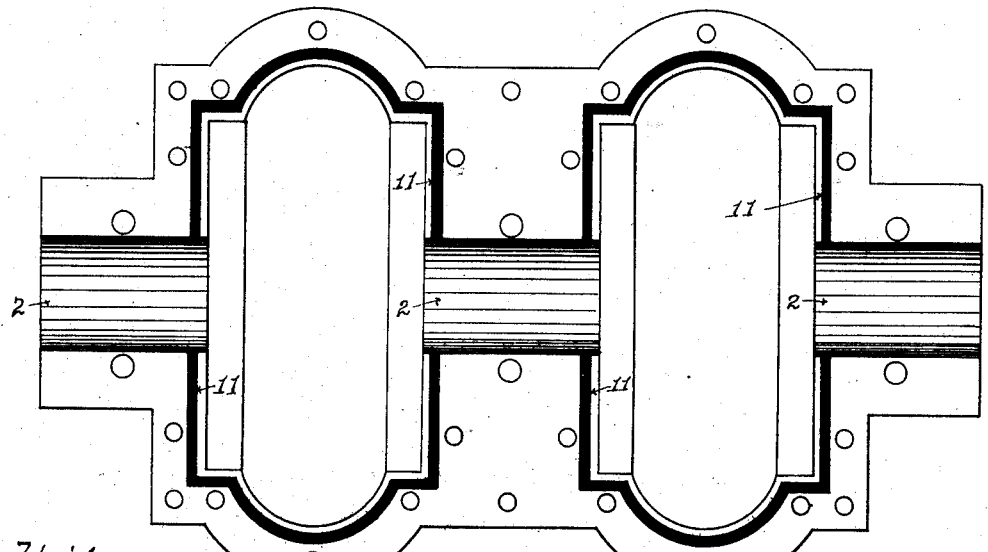

Figure 1 is a longitudinal, vertical central section of a two-cycle, two cylinder engine provided with my improvements. Fig. 2 is a section on the line $x$—$x$ of Fig. 1. Fig. 3 is a detail on the line $y$—$y$ of Fig. 1. Fig. 4 is a plan of the base showing the packing in place in heavy lines.

Parts of the engine not necessary to an understanding of the invention are omitted.

I will first describe my method of preventing the passage of gases around the shaft bearings by reference to Figs. 1 and 3.

1 is the driving or crank shaft.

2 are the bearing seats in the crank case cast integral with the base. These seats are semi-cylindrical, so that the axis of the crank-shaft lies in the plane of the surface of the base. In these seats are placed split bearings made up preferably of bronze bushings 3 and Babbitt metal linings 4. Similar bronze bushings 5 having Babbitt metal linings 6 are placed over the upper halves of the bearing surfaces of the shaft. The problem now is to prevent the passage of gases through the spaces around the bushing 5. To accomplish this I provide in the crank casing annular bevels 7 and bearing caps 8 with corresponding annular bevels 9. These two annular bevels form an inverted V-shaped semi-circular groove over the bushing 5. In this groove I insert bearing packing 10. The cap 8 is held down by screws threaded into the base plate and the packing 10 is compressed in the V-shaped groove making the joint between the bushing and cap gas tight.

Referring now to Figs. 2 and 4 I will describe my method of rendering the crank casing gas tight. In the base plate surrounding the crank shaft well I form a V-shaped groove and in this groove I place a packing 11 which slightly more than fills the groove. Upon this packing the main body of the engine is placed and screwed down, compressing the packing and rendering the joint gas tight. In this manner the crank shaft chamber is entirely closed against the passage of gases.

Having thus described my invention, I claim:

1. In an explosive engine, means for preventing the passage of gases through the bearings, comprising bearing caps, V-shaped grooves one half of the groove being formed in said caps and the other half in the engine body and together forming inverted V-shaped semi-circular grooves, packing in said groove and means for compressing said packing.

2. In an explosive engine, means for preventing the passage of gases through the bearings, comprising bearing caps, bearing bushings split axially, V-shaped grooves, one half of the groove being formed in said caps and the other half in the engine body and together forming inverted V-shaped semi-circular grooves, packing in said grooves and means for compressing said packing.

3. In an explosive engine, means for preventing the passage of gases through the joints, comprising grooves cut in the base-plate and surrounding the crank shaft bearing in said base-plate, packing in said grooves, and inverted V-shaped grooves formed half in the engine body and the other half in the bearing cap, packing in said grooves, said grooves in said base and in said body and cap adjoining at their ends to form a continuous packing space, and means for compressing said packing.

In testimony whereof, I have hereunto set my hand and seal in the presence of two witnesses.

JOHN J. LEARY.

Witnesses:
　CHAS. M. SAWENS,
　ALICE I. MCGRATH.